(12) United States Patent
Dufford et al.

(10) Patent No.: US 9,605,606 B2
(45) Date of Patent: Mar. 28, 2017

(54) SYSTEM AND METHOD FOR IMPROVING ENERGY EFFICIENCY OF A VEHICLE BASED ON DETERMINED RELATIONSHIPS BETWEEN A PLURALITY OF ROUTES

(71) Applicant: Toyota Motor Engineering & Manufacturing North America, Inc., Erlanger, KY (US)

(72) Inventors: Mohammad E. Dufford, Los Angeles, CA (US); Joshua D. Payne, Irvine, CA (US); Geoffrey D. Gaither, Nagoya (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 298 days.

(21) Appl. No.: 14/230,967

(22) Filed: Mar. 31, 2014

(65) Prior Publication Data
US 2015/0275788 A1 Oct. 1, 2015

(51) Int. Cl.
*F02D 29/02* (2006.01)
*B60W 10/06* (2006.01)
*B60W 10/08* (2006.01)
*B60W 30/18* (2012.01)
*F02N 11/08* (2006.01)

(52) U.S. Cl.
CPC ............ *F02D 29/02* (2013.01); *B60W 10/06* (2013.01); *B60W 10/08* (2013.01); *B60W 30/18009* (2013.01); *F02N 11/0837* (2013.01); *F02D 2200/0625* (2013.01); *F02D 2200/501* (2013.01); *F02D 2200/602* (2013.01); *F02D 2200/701* (2013.01); *F02N 2200/123* (2013.01); *F02N 2300/2006* (2013.01); *Y02T 10/48* (2013.01); *Y10S 903/93* (2013.01)

(58) Field of Classification Search
CPC ............... F02D 29/02; F02D 2200/501; F02D 2200/602; F02D 2200/701; F02D 2200/0625; B60W 10/06; B60W 10/08; B60W 30/18009; Y10S 903/93; F02N 11/0837; F02N 2200/123; F02N 2300/2006; Y02T 10/48
See application file for complete search history.

(56) References Cited

U.S. PATENT DOCUMENTS

2008/0021628 A1* 1/2008 Tryon ...................... B60K 6/46
701/99
2013/0096745 A1* 4/2013 Hussain ................ B60W 20/00
701/22

* cited by examiner

*Primary Examiner* — Yuen Wong
(74) *Attorney, Agent, or Firm* — Snell & Wilmer LLP

(57) ABSTRACT

A method/system for optimizing vehicle operations for a predicted route and/or a route set. The method/system may record location data and time data for a route. Two or more routes can be linked to form a route set by analyzing the location data and time data of the routes using a linking threshold. The linking threshold may be based on a relationship between locations and/or times of different routes. The vehicle may predict that a particular route segment or route will likely be driven. An operation of a unit or a device of the vehicle over the predicted route and/or route set may be adjusted based on information stored regarding the predicted route and/or route set in order to enhance the energy efficiency of the vehicle. The links may be categorized as having different types in order to apply a different control strategy to different types of links.

19 Claims, 3 Drawing Sheets

SYSTEM AND METHOD FOR IMPROVING ENERGY EFFICIENCY OF A VEHICLE BASED ON DETERMINED RELATIONSHIPS BETWEEN A PLURALITY OF ROUTES

BACKGROUND

1. Field

The present invention relates to methods and systems of route prediction and improvement of energy efficiency for a vehicle.

2. Description of the Related Art

With global energy prices rapidly increasing, users of vehicles that utilize various forms of energy are increasingly interested in enhancing the overall energy efficiency of the vehicle. The overall energy efficiency accounts for consumption of various forms of energy that may include fuel energy, electrical energy, and/or various forms of regenerated energy. There is a need in the art for a method and a system of actively and dynamically adjusting vehicle operations to improve the overall energy efficiency of a vehicle.

SUMMARY

In an embodiment, a method/system is provided for optimizing vehicle operations for a predicted route and/or route set. The method/system may record location data and time data for a route. Two or more routes can be linked to form a route set by analyzing the location data and the time data of the routes using a linking threshold. The linking threshold may be based on a relationship between locations and/or times of different routes. The vehicle may predict that a particular route segment or route will likely be driven. An operation of a unit or a device of the vehicle over the predicted route and/or the route set may be adjusted based on information stored regarding the predicted route and/or the route set in order to enhance the energy efficiency of the vehicle. The links may be categorized as having different types in order to apply a different control strategy to different types of links.

In an embodiment, a method is provided for optimizing energy efficiency of a vehicle for known routes. The method may include: storing, in a memory, first time data and first location data for a first route; storing, in the memory, second time data and second location data for a second route; setting, using the processor, a link between the first route and the second route based on at least one of the first time data, the first location data, the second time data, or the second location data; predicting, using the processor, that the vehicle will travel over at least one route based on the link between the first route and the second route; and adjusting, using the processor, an operation of the vehicle in advance of or during travelling of the vehicle on the first route or the second route, in order to optimize the energy efficiency of the vehicle.

In an embodiment, a method is provided for optimizing energy efficiency of a vehicle for known routes. The method may include: storing, in a memory, first time data corresponding to a first route and including a start time of the first route and an end time of the first route, and second time data corresponding to a second route and including a start time of the second route and an end time of the second route; storing, in the memory, first location data corresponding to a first route and including a start location of the first route and an end location of the first route, and second location data corresponding to a second route and including a start location of the second route and an end location of the second route; storing, in the memory, a linking threshold; setting, using a processor, a link between the first route and the second route when the processor determines that the vehicle will probably travel on the second route subsequent to traveling on the first route, the determination being based on at least one of the first time data, the second time data, the first location data, the second location data, or the linking threshold; predicting, using the processor, that the vehicle will travel over at least one route based on the link between the first route and the second route; and adjusting, using the processor, an operation of the vehicle in advance of or during travelling of the vehicle on the first route or the second route, in order to optimize the energy efficiency of the vehicle.

In an embodiment, a system is provided for optimizing energy efficiency of a vehicle for known routes. The system may include a memory for storing first time data and first location data for a first route and for storing second time data and second location data for a second route. The system may further include a processor configured to: set a link between the first route and the second route based on at least one of the first time data, the first location data, the second time data, or the second location, predict that the vehicle will travel over at least one route based on a current location, a current time, the first route, the second route, or the link between the first route and the second route, and adjust an operation of the vehicle in advance of or during travelling of the vehicle on the first route or the second route, in order to optimize the energy efficiency of the vehicle.

In an embodiment, a method and a system are utilized for providing driver notifications in a vehicle based on route prediction. A processor of the vehicle records the driving patterns in a memory so as to determine a known route. The vehicle may utilize other information such as the time of day, the day of the week, and the like to determine if the driver will drive the known route. The driver's mobile phone may be connected to the system via a wireless connection (e.g., using Bluetooth) or a remote server may be configured to push events to the vehicle (e.g., the vehicle's processor). The events are processed in conjunction with the known route so as to provide a notification to the driver of an event. The vehicle would use navigation features such as location, time of day, and route prediction to process events from the feed (i.e., mobile phone or remote server) and identify notifications which may be relevant to the driver.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
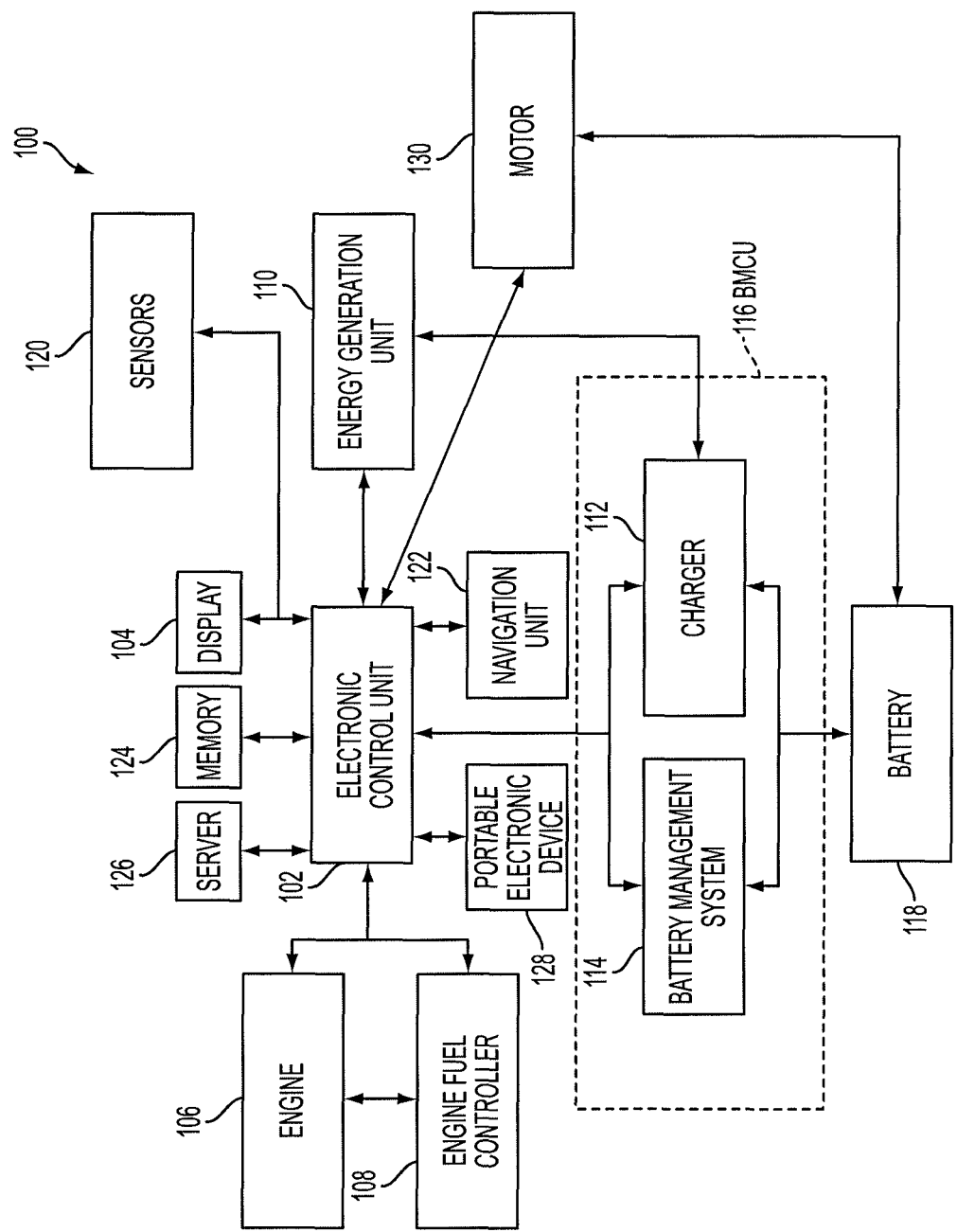
FIG. 1 is a block diagram of a vehicle that utilizes route prediction to improve energy efficiency of the vehicle according to an embodiment of the present invention.

Referring to FIG. 1, a block diagram is shown of a vehicle 100 according to an embodiment of the present invention. The vehicle 100 may include an electronic control unit (ECU) 102, a display 104, an engine 106, an engine fuel controller 108, an energy generation unit 110, a charger 112, a battery management and control unit (BMCU) 116, a battery 118 and sensors 120. The BMCU 116 may include a battery management system (BMS) 114 and the charger 112. The charger 112 may be configured to be coupled to an external charger.

The vehicle 100 operates by utilizing a fuel source and a non-fuel source of energy. The vehicle 100 may be an alternative fuel vehicle, a hybrid electric vehicle, a plug-in hybrid electric vehicle, an electric vehicle or a solar powered vehicle or any other vehicle utilizing a non-fuel source of energy without limiting the scope of the present invention.

The ECU 102 may be in continuous or periodic communication with the display 104, the engine 106, the engine fuel controller 108, the energy generation unit 110, the BMS 114, the charger 112, the navigation unit 122, the memory 124, the motor 130, and/or other units of the vehicle 100 using transmission of electronic signals through a Control Area Network (CAN) bus. In other embodiments, the control and communication may be over various other types of serial or parallel communication links, direct wirings, digital communication buses, wireless communications or other communication links.

The engine fuel controller 108 controls and monitors injection of fuel into the engine 106 for an internal combustion operation. The amount of fuel supplied to the engine 106 may be determined based in part on the pulse width of the fuel injector. The engine fuel controller 108 and/or the ECU 102 may determine a fuel consumption rate using a mass airflow sensor, an oxygen sensor, a throttle position sensor monitoring the throttle valve position, a coolant temperature sensor, an air pressure sensor, an engine speed sensor and/or other input/output sensors generating signals allowing the ECU 102 to determine the fuel consumption rate or amount. The ECU 102 may use a look-up table, an algorithm or data stored in the memory 124 to determine the fuel consumption amount or value. An engine starter may also be utilized to start an operation of the engine 106.

Various types of fuel may be used by the vehicle 100 including but not limited to gasoline, diesel, ethanol, biodiesel, natural gas, propane, hydrogen or combinations thereof. The vehicle 100 may also include a fuel cell in lieu of or in addition to the engine 106 which may charge the battery 118 and/or a capacitor by converting a fuel through a chemical reaction with an oxidizing agent. A fuel consumption sum amount may be calculated and communicated with the ECU 102 in order to determine the fuel consumption rate.

In addition to or alternatively, the vehicle 100 may utilize power provided by the battery 118 for driving the wheels of the vehicle 100. For example, the ECU 102 may control an operation of one or more motors 130. The motor 130 is powered using charge stored in the battery 118 (one or more batteries may be used). The connection between the battery 118 and the motor 130 (and/or other connections shown in FIG. 1) may include inverters and/or converters as known in the art.

In an embodiment, one or motors 130 may be utilized. The motor 130 may be an electric motor for outputting additional torque and power to assist the engine 106 in driving the wheels and/or outputting torque and power to drive the wheels when the engine 106 is in an off state. In an embodiment, the amount of output torque and/or output power supplied by the motor can depend on the amount of output torque and/or output power supplied by the engine 106. For example, more power is provided by the motor 130 to meet a given power demand of the driver when less power is provided by the engine 106. For example, the ECU 102 may control torque and/or power outputted by the motor 130 and may control torque or power outputted by the engine 106 by transmitting control commands from the ECU 102 to the motor 130 and/or the engine 106. The engine 106 and/or the motor 130 may be connected to a transmission with a controllable transmission input/output ratio for driving the wheels using the torque provided by the engine 106 and/or the motor 130. In certain embodiments, the engine 106 and/or the motor 130 may be connected to the transmission for example, via a differential linkage, power splitting mechanisms, and/or various other linkages known in the art.

The motor 130 may include one or more motor-generator. For example, under certain conditions, at least one of the motor-generators may use battery power to drive the wheels, and under certain conditions, at least one of the motor-generators may utilize regenerative braking and/or energy generated by the engine 106 to charge the battery 118.

The ECU 102 may be connected to sensors 120 for detecting various parameters regarding units and/or devices of the vehicle. The sensors 120 may include a vehicle speed sensor. To determine a fuel-equivalent distance-per-energy consumption rate, the ECU 102 may determine the distance travelled during a time period. In one embodiment, the ECU 102 may determine the vehicle speed during the time period using the vehicle speed sensor. The ECU 102 may then integrate the vehicle speed over the time period to determine the distance travelled by the vehicle 100 during the time period. Alternatively, the distance may be determined using location data or more particularly, GPS (Global Positioning System) data received and/or analyzed by a processor of the navigation unit 122.

In an embodiment, the battery 118 provides electrical energy for operation of the vehicle 100. The battery 118 may be any rechargeable battery (or batteries) that is capable of being utilized in the vehicle 100. The battery 118 may be charged, for example, using a generator or a motor-generator. The battery 118, as in for example, an all-electric or a plug-in hybrid vehicle, may be charged using an external charger coupled to the charger 112 or the battery 118.

The electrical energy consumption can be determined by measuring the electrical energy in and out of the battery 118. A change in the level of a state of charge (SOC) of the battery 118 may indicate an electrical consumption rate or amount. The BMS 114 may measure, using battery sensors, parameters that are used to determine the SOC of the battery 118. The battery sensors may measure a voltage, a current, a temperature, a charge acceptance, an internal resistance, self-discharges, magnetic properties, a state of health and/or other states or parameters of the battery 118. In one embodiment, the ECU 102 may determine an SOC percentage or ratio of the battery 118 based on an energy value stored in the battery 118 or the vehicle 100 relative to the current charging capacity of the battery 118.

In an embodiment, the SOC may be determined based on the stored energy value relative to a reference capacity for the battery 118 stored in the memory 124. In an embodiment, the SOC may be measured as a percentage or a ratio relative to another predetermined value associated with the battery 118. Other systems or methods known in the art for determining an electrical energy consumption percentage, value or number may be utilized in the vehicle 100 without limiting the scope of the present invention.

The ECU 102 may determine the fuel-equivalent consumption rate of the electrical energy consumption based on the variation in the SOC of the battery 118. For example, a 33.7 kW-h change in the SOC may correspond to energy stored in approximately one gallon of gasoline. The consumed electrical energy may be converted into a fuel-equivalent amount of energy and added with the fuel consumption sum amount to obtain a fuel-equivalent total energy consumption sum amount. Once the total number of gallons or liters of a fuel-equivalent total energy consumption sum amount is determined, the ECU 102 may divide the travelled distance (miles or kilometers) by the amount of energy of the fuel-equivalent total energy consumption sum amount (gallons or liters) to determine a fuel-equivalent distance-per-energy consumption rate, e.g., in miles per gallon equivalent (MPG-e) or kilometers per liter equivalent (km/l-e). The vehicle 100 may determine and display a fuel-equivalent distance-per-energy consumption rate by converting energy consumption in various forms of energy into a fuel-equivalent energy consumption rate or amount.

In one embodiment, the battery 118 may be coupled to an external charger before the departure time of the vehicle 100. The stored electrical energy may be obtained through charging using an external power source, fuel consumption energy from the engine 106, energy generated by the energy generation unit 110 (e.g., via regenerative braking) or other means. In an embodiment, the battery 118 may also be a capacitor which may be charged by an energy generation unit 110. The energy generation unit 110 may include a solar panel, a ram induction generator, a regenerative braking unit, a heat exchange unit or combinations thereof. The vehicle 100 may also include a catalytic converter connected to the engine 106 to generate heat used by the energy generation unit 110 to charge the battery 118. The energy generation unit 110 may charge the battery 118 using a generator and/or the motor-generator discussed above. In an embodiment, in addition to the fuel consumption and electrical energy consumption discussed above, the ECU 102 may determine the fuel-equivalent non-fuel energy consumption by further taking into account the energy generated by the energy generation unit 110 and the energy conversion efficiency of the energy generation operation.

An energy efficiency value (e.g., MPG-e, km/l-e, or another parameter) may take into account fuel energy consumption, electrical energy consumption, and/or energy regeneration and may be computed in real time. The determined energy efficiency value may be continuously and/or periodically updated and used as feedback for adjusting vehicle operations. Various other methods of taking into account overall energy efficiency may be utilized without limiting the scope of the present invention. The energy efficiency value may be determined, for example, for a distance travelled over a particular route segment, a route, and/or a route set.

The vehicle 100 may further include a navigation unit 122 connected to the ECU 102. The navigation unit 122 may further include a display for interacting with the driver by displaying information as discussed below and/or by accepting inputs, for example, via a touch-screen display. In an embodiment, the navigation unit 122 may include a display for providing visual output such as, for example, maps, navigation, directions, restaurants, entertainment, information, or combinations thereof. The displayed data described herein may refer to data displayed on the display 104, the display of the navigation unit 122, a display of a portable electronic device 128 (such as smart phone in communication with the processor), and/or combinations thereof.

The navigation unit 122 may access GPS data for route prediction. The navigation unit 122 may be integrated in the vehicle 100 or a separate unit coupled to the vehicle 100 or in communication with the ECU 102. In an embodiment, the navigation unit 122 is integrated in a portable electronic device 128 (e.g., a smartphone or a tablet computer). The navigation unit 122 may include a memory and a processor for performing all or some of the specific steps described herein in conjunction with the ECU 102.

Hereinafter, a "processor" may refer to the ECU 102, the processor of the navigation unit 122, a processor of the portable electronic device 128, another processor, or combinations thereof operating in conjunction with one another and configured to perform the steps described herein. For example, some of the steps described herein may be performed by the ECU 102, some of the steps may be performed by the processor of the navigation unit 122, and some of the steps may be performed by the ECU 102 and the processor of the navigation unit 122 communicating and operating in conjunction with one another. The processor may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, electronic control unit, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processor may be connected to a memory 124. In addition, the navigation unit 122 may incorporate a memory connected with the processor or embedded as part of the processor of the navigation unit 122. Hereinafter, the "memory" may refer to the memory 124, the memory of the navigation unit 122, a memory of the portable electronic device 128, a remote memory in communication with the processor, and/or combinations thereof for storing the various information or data used in the predictive process and/or for storing instructions for the steps performed herein. The memory may include off-board memory in communication with the vehicle 100 via wireless communication and/or cloud-based technology.

Figure 2:
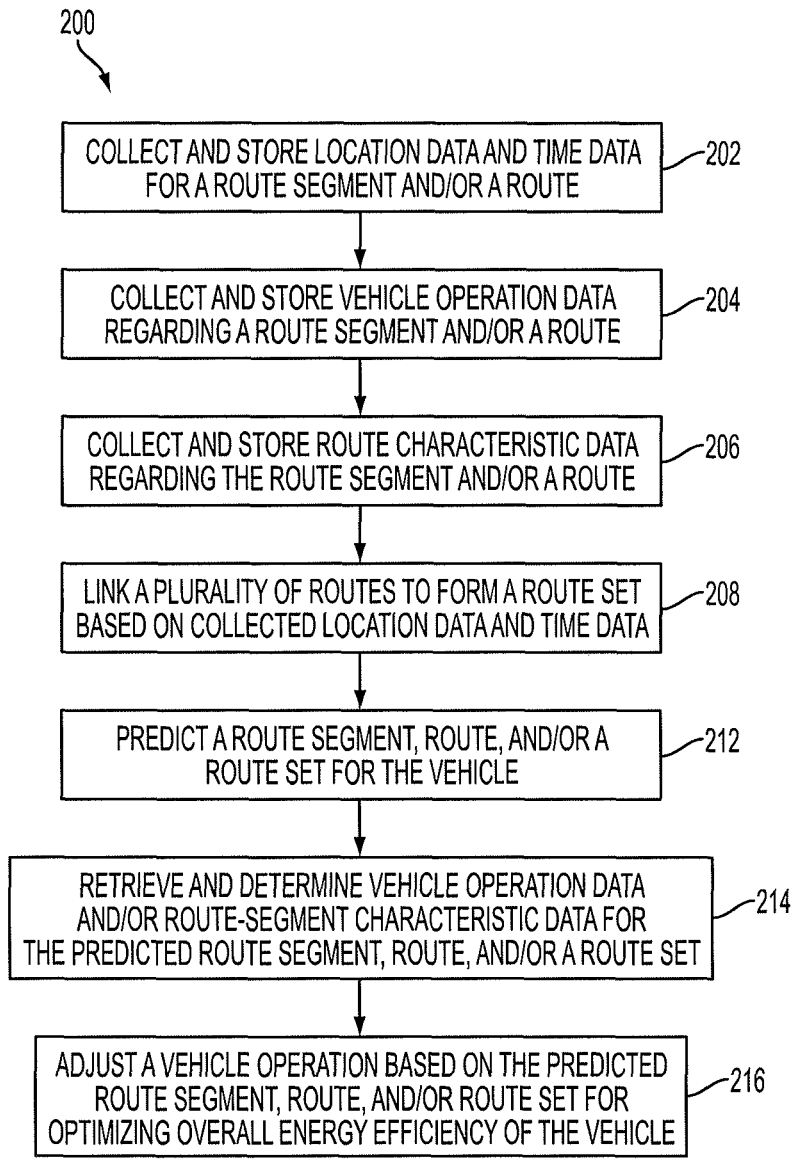
FIG. 2 is a control logic block diagram illustrating a method of adjusting a vehicle operation based on a predicted route segment, a route and/or a route set according to an embodiment of the present invention.

FIG. 2 is a control logic block diagram illustrating a method of adjusting a vehicle operation based on a predicted route segment, a route and/or a route set according to an embodiment of the present invention.

Referring to step 202, the processor may collect information regarding a route segment and/or a route using the sensors 120 and/or the navigation unit 122. A route, as used herein, may refer to a distance travelled between an event signaling a beginning of a trip and an event signaling an end of a trip. For example, such an event may be that the ignition is turned on and subsequently turned off. For example, such an event may be that a door of the vehicle 100 is opened and then shut, and then the door is subsequently opened and shut. The time and/or location of each event may be recorded. "Time," as used herein, may refer to a time of the day, a day of the week, a date, or any other temporal parameter that may be stored regarding a route segment, a route and/or a route set. A "location," as used herein, may refer to latitude or longitude coordinates, a GPS location, a location determined in reference to other known locations, or any other location data regarding the vehicle 100, the route segment, the route and/or the route set.

In an embodiment, by recording each event in the memory, the location of each event, and/or the time that the recorded event takes place, the processor may establish a known route. The processor may store the start/stop location and the start/stop time of each route in the memory and assign each route a unique route identifier. Each route may further include a plurality of route segments. Each route segment may also have a unique route segment identifier. A route set may include a number of different routes linked with one another as described below in more details with respect to step 208. Distance information regarding the route segment, the route and/or the route set may be stored in the memory. In an embodiment, distance may be determined by integrating vehicle speed. In an embodiment, distance may be determined based on distance between GPS locations. The distance values may be summed to obtain a distance of a route set that includes linked routes as discussed below with respect to step 209. The time between the beginning and end of the routes and/or route sets may also be stored.

In an embodiment, as the vehicle 100 travels on a route, GPS coordinates of locations on the route are recorded and time-stamped. Using the location data and the time data, the processor may differentiate between various route segments and store data regarding the route segments. For example, a new route segment may begin when the vehicle 100 makes a new turn (as determined, for example, by the heading data and/or changes in latitude and longitude), and when the turn angle is sharp enough to exceed a turn threshold value. For example, in city driving, as the vehicle 100 turns into different streets, each of those streets may be stored as a route segment. In an embodiment, the route segments may be based on turns and GPS locations without necessarily utilizing GPS map data (for example, regarding the mapping of the streets). In an embodiment, both turn detection and GPS map data (for example, information about terrains and/or street characteristics) may be utilized for differentiating between route segments and/or for storing information regarding the route segments.

In addition to or instead of the turn detection, driving time may be compared to a driving time threshold to divide routes into various route segments. For example, if a long road is driven for 100 miles (roughly 161 km) without making any turns, the 100-mile (161 km) drive may be broken up into different route segments. For example, every 5 miles (8 km) or 10 miles (16 km), the route may be segmented. The threshold values are presented merely as examples for illustration of the route segmentation process. Other thresholds and different parameters may be utilized to divide the routes based on design concerns or criteria.

For example, one design concern may be to improve data storing efficiency by discretizing the routing data. For example, a part of a street may be a part of a number of different routes depending which way the vehicle 100 turns. This segment can be used for multiple routes without inefficiently re-recording the route segment. For example, a route list and a route segment list may be stored in the memory, and each route data entry may include a route identifier and an ordered list of route segments. The ordered list of route segments may include an ordered list of segment identifiers, where each segment identifier corresponds to a segment stored in the segment list of the memory.

Another design concern may be to divide a route into a different route segment such that a new route segment provides new information useful for optimizing energy efficiency during future travel on the route segment. The route segmenting may also assist in future prediction or confirmation that the vehicle 100 is indeed travelling on a given route.

When the vehicle 100 drives on a route segment, the distance of the route segment is known. Other information may be recorded about a particular route segment and/or a route. For example, the average speed of the vehicle in the route segment and/or the route may be calculated (for example, by processing data collected by the vehicle speed sensor). Each route segment may include a route segment identifier, a route segment distance, one or more "to" segments, one or more "from" segments, and a plurality of locations. The route segment distance may be representative of the total distance of the route segment (e.g., the distance from the starting location of the route segment to the ending location of the route segment, or the sum of the distances between each pair of successive locations in the route segment). The one or more "to" route segments may include route segment identifiers for route segments that have been historically travelled immediately after the route segment. The one or more "from" segments may include route segment identifiers for route segments that have been historically travelled immediately before the route segment. Some of the data stored for the routes and/or the route segments may be determined based on GPS data and/or data detected by sensors 120 (e.g., gyroscopes, accelerometers, or the like).

The following example (hereinafter referred to as example (a)) is provided to merely illustrate how the described method can be applied in a particular set of circumstances without limiting the scope of the present invention. For example, assume that a driver leaves his/her house around 7:15 in the morning every weekday to go to work. Further assume that on his/her way to work, the driver drives up a hill to a coffee shop, stops the vehicle 100, gets out of the vehicle 100 to grab a cup of coffee, then starts the vehicle 100, and heads down the hill towards his workplace. Assume also that on Mondays and Wednesdays the driver goes to the gym after work before heading home, and on Tuesdays, Thursdays and Fridays, the driver goes straight home after work. The processor, over time, may identify the following known routes: drive from home to the coffee shop ("KRa1"); drive from the coffee shop to work ("KRa2"); drive from work to the gym ("KRa3"); drive from the gym to home ("KRa4"); and drive from work to home ("KRa5"), wherein KR refers to a route, (a) refers to example (a), and the routes are numbered 1-5 for identification purposes.

The processor may further store various types of data regarding the known routes KRa1-KRa5 or route segments thereof in order to utilize the stored information in future when the processor predicts that the vehicle 100 will travel over the known route segments and/or known routes. For example, start time, end time, start location and/or end location of each of the KRa1-KRa5 routes may be stored in the memory.

Each of KRa1 to KRa4 routes may include one or more route segments. For example, the drive from the coffee shop to work (KRa2) may be divided into various route segments based on the turns and/or the distance driven on a particular street, as discussed above. Each of the KRa1-KRa5 routes may include a list of their corresponding route segments, as discussed above. As discussed below with respect to step 208, the routes may be linked (for example, using corresponding location data and/or time data) to form a route set stored in the memory.

Referring to step 204, the processor collects and stores vehicle operation data for the route segment and/or the route. For example, the processor may determine (using for example, data collected by sensors 120) how the fuel (such as gas) and the battery 118 are consumed or used historically over a route segment and/or a route. For each route segment, route and/or route set, the energy efficiency value may be determined based on fuel flow, electrical energy consumption (based on, for example, the SOC), consumption or regeneration of other forms of energy and/or on-board distance measurement signals that correspond to the given route and/or the route segment, as discussed above with respect to FIG. 1. The processor may store the energy efficiency value for each route segment, route, and/or the overall route in the memory.

For example, an energy efficiency value may be determined for each of the routes KRa1-KRa5, and/or for different route segments of KRa1-KRa5. In addition, for example, the energy efficiency for a route set may be stored. The route set may be, for example, a set of routes linked as described below with respect to step 208. The route set may be, for example, KRa1, KRa2, KRa3 and KRa4 linked with one another. An energy efficiency value for completing the route set (including KRa1-KRa4) may be stored and assigned to the route set instead of or in addition to energy efficiency values stored for each individual KRa1-KRa4.

As discussed above with respect to FIG. 1, various energy efficiency parameters or values may be utilized to determine not only the amount of fuel (e.g., gasoline used), but also the amount of electrical energy used (for example, from the battery 118). For example, the SOC and an amount of electrical energy consumption may be stored for a given route segment and/or the route and may be utilized thereafter. Inefficient operation states may be recorded over a give route and/or a route segment. For example, an overheated battery state or an overly charged battery condition may be stored. If the SOC exceeds a particular threshold or reaches a full battery condition, such information may be stored for a given route segment and/or a route in order to prevent, for example, the full battery condition by preparing in advance for the full battery condition. The fuel flow information, fuel consumption information, MPG based on fuel consumption, and the like may be stored for a given route segment, route, and/or route set and utilized when the processor predicts that the vehicle 100 will travel the same route segment, route, and/or route set. The processor may further store the engine operating time and number of engine starts/stops as this information may also be utilized for determining energy efficiency and as feedback for optimizing energy efficiency in the future. In an embodiment, the energy efficiency value may also take into account efficiency of overall energy which includes electrical energy, fuel energy, and optionally other forms of energy. For example, the energy efficiency value may be a fuel-equivalent energy efficiency value such as MPG-e or km/l-e as discussed above (which takes into account both fuel and electrical energy consumption).

Various other detected and/or calculated parameters may be utilized to keep track of how fuel is being consumed and how electrical energy is being consumed over a given route segment, route, and/or route set. This information serves as feedback data for balancing the power needs of the vehicle 100 when the processor predicts that the vehicle 100 will travel on the given route segment, route, and/or route set. For example, the processor may prepare in advance for the route segment, route, and/or route set in order to optimize energy efficiency.

Referring to step 206, the processor may optionally store route characteristic data regarding the route segment, route, and/or route set. For example, traffic/construction conditions or alerts, road conditions, maneuverability conditions, places of interest to the user and/or other information regarding the route segments, routes, and/or route sets may be stored. For example, KRa1 may be stored in the memory along with information regarding the slope of the hill, traffic on KRa1, and/or other characteristics of the route. Traffic conditions may be obtained, for example, from a remote server 126 in communication with the processor or the navigation unit 122. The remote server 126 may be connected to the processor via wireless communication, the internet, cloud-based communications, and/or using any other data communication link as known in the art.

Referring to step 208, the processor may be further configured to analyze known route segments and/or routes and link the routes together by using the time and location of the respective known routes to form a route set. For example, the processor may link a first known route with a second known route (e.g., a subsequent known route) by analyzing the first and second known routes based on a linking threshold. The linking threshold may be, for example, based on the probability of a subsequent known route being driven. In an embodiment, when the processor determines that the first known route and the second known route fall within the linking threshold, the vehicle operates under the condition that the second known route will probably be driven after the first known route. The first known route and the second known route may form a route set. For example, if a driver stops by the same coffee shop every weekday morning before heading to work, then the route from the coffee shop to work would be a known route subsequent to the initial route from home to the coffee shop, and the processor would link the two routes accordingly. In another example, the processor may store a link including the time data. For example, if the driver goes to a particular coffee shop only on Saturdays, the processor may store a link for the route of home to the coffee shop and the route of the coffee shop to work along with the time data indicating that the route is travelled only on Saturdays.

Referring to example (a) discussed above, the processor may recognize, using a linking algorithm, that on Mondays and Wednesdays, a route set includes the following first group of routes: KRa1, KRa2, KRa3 and KRa4, and on Tuesdays, Thursdays and Fridays, a route set includes the following second group of routes: KRa1, KRa2 and KRa5. The linking algorithm may be based on the known routes (KRa1-KRa5) and their corresponding start/stop locations and/or start/stop times.

The route sets may be combined to form a round trip, for example, based on a return of a driver to a starting location (e.g., home) and/or based on driving profiles over a predetermined period of time. A route set may or may not be a complete round trip. For example, the route set of KRa1, KRa2, KRa3 and KRa4 is a round trip as the driver starts from home in KRa1 and reaches home at the end of KRa4.

The linking threshold for forming a route set may be based on start/stop locations of routes and/or their corresponding route segments, start/stop times of routes and/or their corresponding route segments, frequency of stopping/starting, other factors, and combinations thereof. For example, in order to link KRa1 and KRa2, the processor may check whether the end location of KRa1 matches (or is very close) the start location of KRa2. For example, this step ensures that there was no driving in between KRa1 and KRa2 that was not recorded. The linking threshold may be based on timing of the routes, and for example, based on start/stop times of the routes and/or the time period between the routes.

In an embodiment, link type data may be stored, for example, when routes and/or route segments are linked. The following example (hereinafter referred to as example (b)) is provided to illustrate how links may be categorized in a particular set of circumstances without limiting the scope of the present invention. Assume a driver drives from home to a grocery store ("KRb1"), shops for 20 minutes, and drives back home ("KRb2"). There is a 20-minute gap between the two routes KRb1 and KRb2. Here, the end location of the first route KRb1 matches the start location of the return route KRb2, and the link between KRb1 and KRb2 may be stored. For example, the time period may be compared with a time period linking threshold to categorize the link. Further assume that the driver drives from work to home ("KRb3") and then stays overnight at home for 12 hours, and then drives from home to work in the morning ("KRb4"). The link between KRb1 and KRb2 may be stored and categorized differently than the link between KRb3 and KRb4. One reason for categorizing the two links differently is that a different control strategy may be appropriate for each link type. For example, when the time period is long (e.g., as in time period between KRb3 and KRb4), it would be energy efficient for the vehicle 100 to utilize this information and prepare for KRb4 in advance, for example, during KRb3 prior to the time period, as discussed below with respect to step 216.

For example, to illustrate the link type concept without limiting the scope of the present invention, there may be 4 categories of routes in terms of time period: 1—links with less than or equal to 30-minute time period, 2—links with time periods greater than 30 minutes but less than or equal to 2 hours, 3—links with time periods greater than 2 hours, but less than or equal to 8 hours, and 4—links with time periods greater than 8 hours. In terms of vehicle control strategy, the processor may treat the category 1 links as if there was no stopping between the two linked routes. Category 2 links may be treated differently because for example, the soak time of the engine 106 may be significantly higher than the soak time in category 1 links, thereby requiring a different control strategy to enhance energy efficiency. In other words, in category 2 links, the engine 106 has to expend more energy to re-warm up again after the 30 minute to 2-hour gap as compared with category 1 links wherein the engine is still warm after the short time period. The processor may determine that it may not be energy efficient to utilize the engine 106 after the time period of the category 2 link if sufficient battery power is available for the subsequent route after the time period. This control strategy would prevent the inefficiency associated with re-warming up the engine 106 after the cool-down during the 30-minute to 2-hour gap.

The information stored regarding the linked routes and/or the linked route segments is utilized to optimize the efficiency of the vehicle. The vehicle operation data and/or the route characteristic data for a given route segment and/or route may be processed in conjunction with one or more linked known route segments and/or routes. Other information about the route set may be stored, as discussed above with respect to routes and/or route segments. For example, the distance, average speed, location data, and/or time data regarding the route set may be stored.

Referring to step 212, in an embodiment, the processor searches the database of the memory to determine matching (or within a predetermined threshold) route segments, routes, and/or a route set based on a current location and/or previously or currently driven route segments, routes and/or route sets. The processor may predict that the vehicle will travel on a route segment, a route and/or a route set. Information regarding the predicted route segment, route and/or route set may be retrieved for improving the energy efficiency of the vehicle.

In an embodiment, the processor may identify one or more matching route segment candidates from the stored route segment list based on a current GPS location. In an embodiment, the one or more route segment candidates are identified by accessing the route segment list stored in the memory, determining the distances between a current location and each location of each segment in the route segment list, and identifying the one or more route segment candidates at those segments of the segment list that have at least one location within a distance proximity threshold from the second location. For example, in an embodiment, the distance proximity threshold may be 60 meters such that all segments within 60 meters of the current location are identified. In other embodiments, various other thresholds or parameters may be utilized to obtain the segment candidates. Similarly, route candidates may be identified from the route list. For example, the processor may determine which of the routes on the route list include any of the one or more of the identified segment candidates to determine which route the vehicle may be currently on.

The processor may calculate a route weight for each identified route candidate. For example, the route weight may be based on the start/end times, start/end locations, current time, current day of the week, the ratio of the number of times the identified candidate route was travelled to the total number of times any of the candidate routes were travelled, various other factors, and/or combinations thereof. For example, the processor may consider what time of day the route candidate was driven usually in comparison to the current time. The route weight may be a weighting function based on the foregoing corresponding data.

The route segment weights, route weights, list of route segment candidates and/or route candidates may be updated for example, based on newly collected data (for example, an updated current location of the vehicle). For example, an updated current location may indicate that one of the route candidates is no longer a plausible or probable candidate. The processor considers the weights of the route segment candidates and/or the route candidates and predicts a route(s) and/or a route segment(s) by selecting amongst the route candidates and/or route segment candidates, respectively.

Based on the links stored in the memory, the processor may predict which routes will be completed subsequent to a predicted first route, and retrieve information regarding the linked routes and their corresponding route segments. For example, it may be determined that the vehicle will travel on a predicted second route after completing a current first route. The prediction may be based on a current location, a current time of the day, and/or a current day of the week to predict whether a subsequent route will be driven. For example, referring to example (a) set forth above, the method may predict that based on the current location being home of the driver, the current day being Monday and the current time of day being 7:15 AM, the following route set will probably be completed: KRa1, KRa2, KRa3 and KRa4. As such, by utilizing times and routes, the vehicle can determine a route set by linking multiple known route segments or routes.

In an embodiment, after the route and/or the route set are completed, the processor may consider the historical data over the route and/or the route set travelled. The processor may compare the route and/or the route set just travelled to the predicted route and/or the route set. If the travelled route and/or the route set and the predicted route and/or the route set match, respectively, no new route and/or route set entry is made, but the information regarding the route and/or the route set may be updated. In an embodiment, a new instance of the same route and/or the route set may be stored when the travelled route and/or the route set matches the predicted route and/or the route set, respectively. For example, the new instance may indicate that the driver drove the predicted route and/or the route set on a particular day and time. In an embodiment, to prevent inefficiency in data storage and processing, the location data (e.g., GPS information) do not need to be re-stored. At a later time, the new instance of the route and/or the route set may be utilized in determining frequency of driving when applying the weighting functions for prediction. If the travelled route and the predicted route do not match, the travelled route may be stored as a new route with a new route identifier and corresponding information, as discussed above.

Referring to step 214, when the processor predicts that the vehicle will travel on a route segment, route, and/or route set, the processor retrieves the corresponding vehicle operation data for the corresponding route segment, route and/or route set. For example, the retrieved data may include vehicle operation data (for example, the stored energy efficiency values) for each of the predicted route segments, routes and/or route sets. The retrieved data may further include route characteristic data (for example, road and/or traffic conditions) for the predicted route segment, route and/or route set. For example, the retrieved data may indicate that the predicted route of KRa1 will be uphill with certain retrieved traffic conditions, and the predicted route of KRa2 will be downhill with certain retrieved traffic conditions. The route characteristic data may be retrieved from a previously stored database when the route segment, route and/or route set was driven, and/or may be based on current information received from the remote server 126. The information may be utilized to manage an operation of a unit or a device of the vehicle (such as discharge of the battery 118), as discussed below with respect to step 216.

Referring to step 216, for example, the retrieved energy efficiency values and/or the retrieved route characteristic data for a route segment, route and/or route set may be utilized for adjusting vehicle operations and driving performance. For example, energy efficiency information may be utilized as feedback data for improving overall energy efficiency of the vehicle over the course of a route segment, route and/or route set by adjusting powertrain control parameters.

In an embodiment, when the predicted route is driven and information is retrieved about the route indicating that an SOC overflow is expected, the processor may prevent this inefficient condition by, for example, depleting the battery at an earlier stage and to a greater extent.

Referring to example (a) set forth above, the vehicle 100 may be configured to utilize only battery power without utilizing the engine for driving the vehicle when driving on the uphill KRa1 route because the processor predicts that the vehicle will subsequently drive on the KRa2 downhill route which regenerates electrical energy for storage in the battery 118 through regenerative braking. The vehicle operation may also be adjusted on the predicted distance of a predicted route set (e.g., KRa1 and KRa2).

It may be determined that based on the predicted routes, the vehicle will reach a charging point (such as home or a recharging station). With this information and in anticipation of the charging point, the vehicle may deplete the battery (for example, by outputting more power using the motor 130) in advance to a greater extent than if the information regarding the approaching recharging point were not available in order to enhance overall energy efficiency.

For example, a route segment may be identified that is associated with high fuel consumption. This information may be stored and analyzed such that more electrical energy is utilized (if efficient to do so) when it is predicted in the future that the vehicle 100 will be travelling on this route.

As such, the stored information about the route segment, route and/or route set may allow the processor to determine how much power to draw using the motor 130 and the battery 118 and how much energy to draw from the engine 106 based on the historical data.

Referring to example (b) set forth above, the processor may predict a category 4 time period between two successive routes (for example, 12 hours). The soak time is significantly high for the overnight stay. The processor may prepare in advance for KRb4 before KRb3 is completed. For example, assume that the driver in example (b) lives at the top of a hill. Every morning when driving on route KRb4, the driver drives down the hill. Without knowledge of the historical data, the battery 118 may be already full, and it may not be able to regenerate any energy to store in the battery 118. The processor may deplete the battery 118 on KRb3 before the driver reaches home to open up charge storage space in the battery 118 for regenerative energy storage during KRb4.

In another example, assume the processor predicts that the soak time will be high and the engine 106 will cool down. If there is an option to choose EV driving mode (that is, for example, the SOC is high enough for EV driving during the subsequent route), then charge of the battery 118 may be saved for the second route when the engine 106 has cooled down after the soak time such that the engine 106 would not have to be utilized. As a result, the overall energy efficiency would be improved because the inefficiency for warming up the engine 106 would be avoided.

In yet another example, assume a driver charges the vehicle 100 at a charging station at his/her work place, and assume the vehicle 100 has 10 miles (16.09 km) of EV driving range after the vehicle 100 is charged at the work place. Furthermore, assume that after work, the driver drives to a gym that is 20 miles (32.18 km) away from his/her work place, and the gym is in close proximity of his/her home (for example, the gym is only 3 miles (4.8 km) away from his home). Furthermore, assume that the vehicle 100 remains at the gym for a long enough time (e.g., during the driver's 2-hour work-out at the gym) such that the engine 106 cools down before heading home. When driving from work to the gym, the vehicles known in the art would deplete the battery charge and use the 10 miles (16.09 km) driving range during the route from work to the gym. The vehicles known in the art would inefficiently re-start and re-warm the engine 106 for operation during the short drive from the gym to home. In an embodiment of the present invention, the processor learns the location data regarding the length of the routes and learns the time data regarding the time period between the routes (e.g., the 2-hour time gap). The processor predicts the routes and may save sufficient charge of the battery 118 for the route from the gym to home if possible (based on, for example, the available charge of the battery 118), thereby preventing or reducing the energy inefficiency associated with re-starting and re-warming the engine 106. In other words, the processor manages engine power and battery power during the route from the work place to the gym such that enough EV driving range remains for the route from the gym to home. For example, the vehicle 100 may reserve at least 3 miles (4.8 km) of EV driving range for the route from the gym to home to avoid inefficiencies associated with re-warming the engine 106.

Conversely, in another example, when the soak time is very low (for example, in category 1 as discussed above), the engine 106 is still warm, and the processor may determine that it is not inefficient to utilize the engine 106 from the beginning of the subsequent route after the short time period.

For a plug-in hybrid vehicle with, for example, 20 miles (32.2 km) of EV driving, the default control strategy may be to deplete the 20 miles (32.2 km) of electrical charge at a fast pace. In an embodiment of the present invention, when the processor predicts that the vehicle will travel over a long route set, the processor may manage discharging of the battery more efficiently by spacing out the discharge of the battery or discharging the battery at a lower (e.g., slower) rate.

Referring to example (b) set forth above, further assume that the commute from home to work KRb4 includes a mile of city road/driving and 20 miles (32.2 km) of freeway driving to get to work, and the drive from work to home KRb3 also involves 20 miles (32.2 km) of freeway and a mile of city driving. Under default settings, a vehicle that has 20 miles (32.2 km) of EV driving and without information regarding the route set may discharge the 20 miles (32.2 km) of EV driving at a fast pace during KRb4. But in an embodiment of the present invention, the processor may recognize that charging is performed at home (not at the work place) and space out the 20 miles (32.2 km) of EV driving more efficiently. For example, the processor may utilize the EV driving for the city and utilize the engine 106 on the freeway. As a result, enough battery charge will be left on the drive back home KRb3, thereby rendering the overall route set from home to work and from work to home to be more energy efficient in terms of both electrical and fuel energy consumption.

In an embodiment, the steps described above with respect to route prediction and storage of data regarding the routes and route segments in the database may be performed by the processor of the navigation unit 122. In an embodiment, the GPS device may be integrated in a portable electronic device 128 (such as a smart phone or a tablet), and the steps described above may be performed by the processor of the portable electronic device 128. The processor of the navigation unit 122 and/or the portable electronic device 128 may provide information about the predicted routes and linked routes to the ECU 102 (for example, a hybrid control ECU). These steps can be performed in a single processor or ECU without limiting the scope of the present invention.

The steps described above with respect to FIG. 2 may not necessarily be performed in the order presented above. For example, the routes may first be linked into a route set in step 208, and then information (e.g., vehicle operation data, route characteristic data, etc.) may be stored for the linked route set as set forth above with respect to steps 204 and 206.

Figure 3:
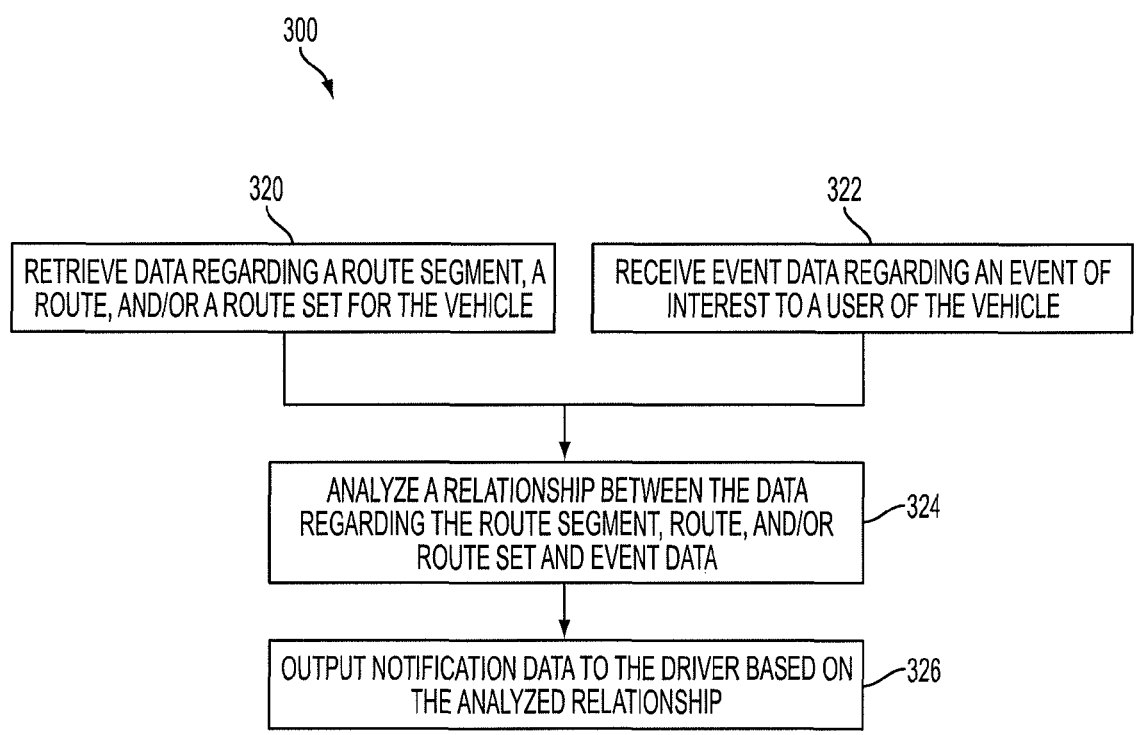
FIG. 3 is a control logic block diagram illustrating a method of outputting notification data to a user of a vehicle based on event data and data regarding a route segment, a route and/or a route set according to an embodiment of the present invention.

The system and method discussed above may further provide driver notifications based on route and/or route segment prediction. FIG. 3 is a control logic block diagram illustrating a method/system 300 of outputting notification data to a user of a vehicle based on event data and data regarding a route segment, a route and/or a route set according to an embodiment of the present invention. The vehicle 100 may be a hybrid vehicle, as discussed above with respect to FIG. 1.

Referring to step 320 of FIG. 3, the processor (e.g., the processor of the navigation unit 122 or another processor as set forth above) may retrieve data regarding a route segment, a route and/or a route set as set forth above with respect to steps 202-212 of FIG. 2. For example, the route segment, route and/or route set may be predicted, and corresponding time data, location data, vehicle operation data, route characteristic data, and various other data discussed above may be retrieved (e.g., with respect to steps 202-214).

Referring to step 322 of FIG. 3, the processor may receive event data regarding an event of interest to a user of the vehicle. For example, referring to FIG. 1, the portable electronic device 128 or a remote server 126 may provide the event data to the processor. The processor may retrieve or receive the data from any computing device or server in communication with the processor, for example, via wireless communications (e.g., Bluetooth connection) and/or cloud-based technology. The portable electronic device 128 may be, for example, a smart phone, a tablet, or a laptop, or any other computing device capable of establishing a wireless or wired communication with the ECU 102 or a processor of a vehicle. The portable electronic device 128 may feed (e.g., wired or wirelessly transfer) event data to the processor or the ECU 102 regarding events of interest to the driver. The event data may include corresponding information regarding the event, including but not limited to location data, time data and/or descriptive data. Alternatively or in addition, the processor may receive similar data from a remote server 126.

In an embodiment, the processor may receive inputs from a user of the vehicle 100 to add, delete and/or adjust the notifications and/or event data. For example, the display 104 may be an interactive input/output touch screen display of an infotainment unit of the vehicle and/or a navigation unit 122. The infotainment unit and/or the navigation unit 104 may include a dial, buttons, and/or any other input device for accepting changes to the notifications and/or event data. The vehicle may accept inputs from the user via other devices and/or communication links without limiting the scope of the present invention. The input data may include notification trigger data such as location, time and/or characteristic of a route that define conditions under which the user desires to receive notification outputs.

Referring to step 324, the processor (e.g., ECU 102) solely or in conjunction with other processors may analyze or process the event data received from the feed (e.g., portable electronic device 128 or the remote server 126) along with data regarding the known route segments, routes and/or route sets. The processor may determine a relationship between the data regarding the known route segments, routes and/or route sets and the event data. The determined relationship may be further based on a current location or time. The determined relationship may indicate information that would be helpful to a user of the vehicle 100.

Referring to step 326, in an embodiment, the processor may output notifications or other helpful information to the user based on the determined relationship. The output may be via an audio output unit (not shown) and/or via the display 104. Alternatively or in addition, the processor may output notification data to the portable electronic device 128 such that the portable electronic device 128 may output the notification information to the driver, e.g., via its display or an audio output.

The following example is provided for illustration purposes without limiting the scope of the invention. For example, if a driver normally leaves home for work at 8:30 AM, but stops at a coffee shop on his/her way to work, the processor may predict that the vehicle 100 will travel on a known route segment, route and/or route set corresponding to the foregoing work commute using, for example, one or more of steps 202-214 as discussed above with respect to FIG. 2. Referring to step 320 of FIG. 3, the processor may retrieve location data, time data, route characteristic data (e.g., traffic conditions, constructions on the route, and/or maneuverability conditions), and/or other information regarding the work commute including the stop at the coffee shop, as discussed above with respect to FIG. 2. Referring to step 322, the processor may receive event data about a morning meeting event in at the driver's office (before or after performing the route prediction steps). For example, the mobile phone may have a calendar software application that indicates a 9:00 AM meeting in the office.

Referring to step 324, the processor may determine and/or analyze a relationship between the meeting event and information regarding the predicted route segment, route and/or route set of the work commute (including the coffee shop stop). For example, the processor may determine that stopping at the coffee shop may not allow the driver to attend the meeting in time. This decision may be based on learned timing data of the work commute, learned location data of the work commute, current time and/or location, meeting location and/or time, other information discussed above with respect to FIG. 2 and/or combinations thereof. For example, the decision may be based on the vehicle's learned knowledge of the time it takes the driver to go to coffee shop each morning and may be adjusted based on traffic data. The traffic data may be retrieved, for example, in substantially real time from a remote server 126 or learned from a feed (e.g., the mobile phone of the user). Referring to step 326, the processor may output a notification or a warning helpful to the driver, indicating that the stop at the coffee shop may make him/her late to the morning meeting in the office. For example, the information may be output using the display 104, an audio output, the mobile phone of the user and/or various other output forms and devices, as discussed above with respect to step 326.

Similarly, in another example, the processor may determine that street sweeping occurs at 6 AM on Tuesday mornings based on learned route characteristic data and/or route characteristic data received from a remote server 126. The processor may predict that the driver will reach the particular street and warn the driver not to park on the street.

The steps described above with respect to FIG. 3 may not necessarily be performed in the order presented above. For example, the route may be determined and route information may be retrieved in step 320 before or after the event data is received or determined in step 322.

Referring back to FIG. 2, step 212 may be further based on event data discussed above with respect to FIG. 3. For example, event data (regarding an upcoming meeting) may indicate a given destination location. The route segment, route and/or route set may be predicted based on the event data (e.g., the given destination location). For example, if the processor predicts that the driver may travel over a plurality of route segment, route and/or route set candidates, the event data may assist the processor in eliminating some of the candidates to arrive at a more accurate prediction.

The logical modules and steps for the vehicle 100 described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of optimizing energy efficiency of a vehicle for known routes, the method comprising:

collecting, by a processor, and storing, in a memory, first time data of a first previously-travelled route and first location data for the first previously-travelled route;

collecting, by the processor, and storing, in the memory, second time data of a second previously-travelled route and second location data for the second previously-travelled route;

determining, by the processor, a link between the first previously-travelled route and the second previously-travelled route based on at least one of the first time data, the first location data, the second time data, or the second location data;

categorizing, by the processor, the link between the first previously-travelled route and the second previously-travelled route into a respective link category of a plurality of link categories based on a time period between the vehicle having travelled the first previously-travelled route and the vehicle having travelled the second previously-travelled route;

determining or predicting, by the processor, a predicted route that includes the first previously-travelled route and the second previously-travelled route that the vehicle will travel over; and controlling, by the processor, a sequence of a usage of an engine and a battery of the vehicle in advance of or during travelling of the vehicle on the predicted route based on the respective link category of the link between the first previously-travelled route and the second previously-travelled route to optimize the energy efficiency of the vehicle for travel along the predicted route.

2. The method of claim 1 wherein determining or predicting, by the processor, the link between the first previously-travelled route and the second previously-travelled route is based on a linking threshold.

3. The method of claim 2 wherein determining or predicting, by the processor, the predicted route includes determining or predicting that the vehicle will travel on the second previously-travelled route subsequent to traveling on the first previously-travelled route based on the determined or predicted link and the linking threshold.

4. The method of claim 2 wherein the first location data corresponds to at least a start location of the first previously-travelled route and an end location of the first previously-travelled route, and the second location data corresponds to at least a start location of the second previously-travelled route and an end location of the second previously-travelled route,
- the linking threshold includes a distance proximity threshold, and
- the processor is configured to set the link between the first previously-travelled route and the second previously-travelled route when a distance between the end location of the first previously-travelled route and the start location of the second previously-travelled route is within the distance proximity threshold.

5. The method of claim 1 further comprising storing, in the memory, the respective link category based on the first time data, the first location data, the second time data and the second location data.

6. The method of claim 1 wherein
- the first time data corresponds to at least a start time of the first previously-travelled route and an end time of the first previously-travelled route, and the second time data corresponds to at least a start time of the second previously-travelled route and an end time of the second previously-travelled route, and
- wherein the time period is between the end time of the first previously-travelled route and the start time of the second previously-travelled route.

7. The method of claim 6 wherein the processor includes an electronic control unit (ECU) connected to the engine of the vehicle, and controlling, by the processor, the sequence of the usage of the engine and the battery of the vehicle includes using the ECU to control the engine and the battery to prevent or reduce energy inefficiency corresponding to re-warming of the engine.

8. The method of claim 6 further comprising providing a motor connected to the processor for driving the vehicle using electrical energy stored in the battery of the vehicle, wherein controlling, by the processor, the sequence of the usage of the engine and the battery of the vehicle includes adjusting, by the processor, power outputted by the motor and the battery in advance of reaching the second previously-travelled route to reserve sufficient charge in the battery for travelling on the second previously-travelled route.

9. The method of claim 1 wherein the processor includes an electronic control unit (ECU), and controlling, by the processor, the sequence of the usage of the engine and the battery of the vehicle includes using the ECU to control the sequence.

10. The method of claim 1 further comprising providing a motor connected to the processor for driving the vehicle using electrical energy stored in the battery of the vehicle, wherein controlling, by the processor, the sequence of the usage of the engine and the battery of the vehicle includes adjusting, by the processor, power outputted by the motor and the battery.

11. The method of claim 1 further comprising:
- storing, in the memory, vehicle operation data for the first previously-travelled route and the second previously-travelled route,
- wherein controlling, by the processor, the sequence of the usage of the engine and the battery of the vehicle is further based on the vehicle operation data for the first previously-travelled route and the second previously-travelled route.

12. The method of claim 11 wherein
- the vehicle operation data includes an energy efficiency value corresponding to efficiency of utilizing power from the engine of the vehicle and power from the battery of the vehicle when the vehicle previously-travelled on the first previously-travelled route, the second previously-travelled route or a route set that includes the first previously-travelled route and the second previously-travelled route, and
- controlling, by the processor, the sequence of the usage of the engine and the battery of the vehicle is further based on the energy efficiency value.

13. The method of claim 1 wherein controlling, by the processor, the sequence of the usage of the engine and the battery of the vehicle is further based on a total distance of a route set that includes the linked first previously-travelled route and the second previously-travelled route.

14. A method of optimizing energy efficiency of a vehicle for known routes, the method comprising:
- collecting, by a processor, and storing, in a memory, first time data corresponding to a first previously-travelled route and including a start time of the first previously-travelled route and an end time of the first previously-travelled route, and second time data corresponding to a second previously-travelled route and including a start time of the second previously-travelled route and an end time of the second previously-travelled route;
- collecting, by the processor, and storing, in the memory, first location data corresponding to a first previously-travelled route and including a start location of the first previously-travelled route and an end location of the first previously-travelled route, and second location data corresponding to a second previously-travelled route and including a start location of the second previously-travelled route and an end location of the second previously-travelled route;
- storing, in the memory, a linking threshold;
- determining, by the processor, a link between the first previously-travelled route and the second previously-travelled route when the processor determines that the vehicle will travel on the second previously-travelled route subsequent to traveling on the first previously-travelled route based on at least one of the first time data, the second time data, the first location data, the second location data or the linking threshold;
- categorizing, by the processor, the link between the first previously-travelled route and the second previously-travelled route into a respective link category of a plurality of link categories based on a time period between the vehicle having travelled the first previously-travelled route and the vehicle having travelled the second previously-travelled route;
- determining or predicting, by the processor, a predicted route that includes the first previously-travelled route and the second previously-travelled route that the vehicle will travel over; and
- controlling, by the processor, a sequence of a usage of an engine and a battery of the vehicle in advance of or during travelling of the vehicle on the predicted route based on the respective link category of the link between the first previously-travelled route and the second previously-travelled route to optimize the energy efficiency of the vehicle for travel along the predicted route.

15. The method of claim 14 further comprising storing, in the memory, the respective link category.

16. The method of claim 14 further comprising providing a motor connected to the processor for driving the vehicle using electrical energy stored in the battery of the vehicle, wherein
the processor includes an electronic control unit (ECU) connected to the engine of the vehicle, and
controlling, by the processor, the sequence of the usage of the engine and the battery of the vehicle includes:
adjusting, by the processor, power outputted by the engine based on the link type data, or
adjusting, by the processor, power outputted by the motor and the battery based on the respective link category.

17. A system for optimizing energy efficiency of a vehicle for known routes, the system comprising:
a memory for storing first time data and first location data for the first previously-travelled route, and for storing second time data and second location data for the second previously-travelled route; and
a processor configured to:
determine a link between the first previously-travelled route and the second previously-travelled route based on the first time data, the first location data, the second time data, or the second location,
categorize the link between the first previously-travelled route and the second previously-travelled route into a respective link category of a plurality of link categories based on a time period between the vehicle having travelled the first previously-travelled route and the vehicle having travelled the second previously-travelled route,
determine or predict a predicted route that includes the first previously-travelled route and the second previously-travelled route that the vehicle will travel over based on a current location, a current time, the first previously-travelled route, the second previously-travelled route, or the link between the first previously-travelled route and the second previously-travelled route, and
control a sequence of a usage of an engine and a battery of the vehicle in advance of or during travelling of the vehicle on the first previously-travelled route and the second previously-travelled route based on the respective link category.

18. The system of claim 17 wherein
the memory is further configured to store respective link category based on the first time data, the first location data, the second time data, and the second location data.

19. The system of claim 17 further comprising providing a motor connected to the processor for driving the vehicle using electrical energy stored in the battery of the vehicle, wherein the processor is configured to adjust power outputted by the motor and the battery based on the respective link category to optimize the energy efficiency of the vehicle.

* * * * *